United States Patent

Tazartes et al.

[11] Patent Number: 5,963,323
[45] Date of Patent: Oct. 5, 1999

[54] METHOD FOR IMPROVING THE PERFORMANCE OF FIBER-OPTIC GYROS BY CALCULATING THE BIAS FROM USING A BROADBAND SOURCE

[75] Inventors: Daniel A. Tazartes, West Hills; John G. Mark, Pasadena; James G. Welker, Woodland Hills, all of Calif.

[73] Assignee: Litton Systems, Inc., Woodland Hills, Calif.

[21] Appl. No.: 09/019,848

[22] Filed: Feb. 6, 1998

[51] Int. Cl.[6] .................................................. G01C 19/72
[52] U.S. Cl. ............................................................ 356/350
[58] Field of Search ............................................. 356/350

[56] References Cited

U.S. PATENT DOCUMENTS 5,682,241  10/1997  Mark et al. ............................. 356/350

*Primary Examiner*—Samuel A. Turner
*Attorney, Agent, or Firm*—Robert E. Malm

[57] ABSTRACT

The invention is a method for improving the performance of a fiber-optic gyro comprising counter-propagating light beams from a broadband source in an optical fiber configured as a coil. The fiber-optic gyro is of the type where the phases of the light beams are step-modulated at one or both ends of the optical fiber at time intervals equal to the light propagation time $\tau$ through the optical fiber, the step being in the range from 0 to $2\pi-\delta$ radians where $\delta$ is an infinitesimal. The step is the sum of an estimate of the Sagnac phase residual $\phi_{SE}$ with reversed sign and the quantity $(2\pi k + j\phi_M)$ where the index k can take on the values $-1$, $0$, and $1$, and the index j can take on the values $-1$ and $1$. The phase angle $\phi_M$ is a positive constant less than $\pi$ radians. The method comprises the steps of determining the interferometer output light intensity, determining the Sagnac fringe number n, calculating the error $P_{nkj}$ in the interferometer output light intensity attributable to the use of a broadband light-beam source for particular values of an index pair (k,j), determining estimates $A_{kj}$ of the probabilities of the index pairs (k,j) by counting the occurrences of each index pair (k,j) over a period of time, and determining the bias $\epsilon$ in the output of a fiber-optic gyro. The bias $\epsilon$ can be made independent of the Sagnac fringe number by proper design of the statistical properties of the phase modulating function.

10 Claims, 1 Drawing Sheet

METHOD FOR IMPROVING THE PERFORMANCE OF FIBER-OPTIC GYROS BY CALCULATING THE BIAS FROM USING A BROADBAND SOURCE

BACKGROUND OF INVENTION

This invention relates generally to fiber-optic gyros and more specifically to the signal processing associated with fiber-optic gyros.

Fiber-optic gyros measure rate of rotation by determining the phase difference in light waves that propagate in opposite directions through a coil wound with optical fiber. Light waves that propagate through the coil in the direction of rotation take a longer time than light waves that propagate through the coil in the direction opposite to the direction of rotation. This difference in time, measured as the phase difference between counter-propagating light waves, is proportional to the angular velocity of the coil.

A typical block diagram for a fiber-optic gyro is shown in FIG. 1. A light source 2 supplies a reasonably coherent light beam to the optical-fiber interferometer 4 which causes the input light beam to be split into two light beams that are fed into opposite ends of an optical fiber configured as a coil. The light beams emerging from opposite ends of the optical fiber are recombined into a single output light beam which feeds into the detector 6.

The output of the detector 6 is given by $$I = \frac{I_o}{2}[1 + \cos\theta(t)] \quad (1)$$

where $I_0$ is the peak light intensity and $\theta(t)$ is the phase difference between the two beams expressed as a function of time.

The phase difference $\theta(t)$ typically takes the form $$\theta(t) = [\Phi(t)]_{mod\ 2\pi} - [\Phi(t-\tau)]_{mod\ 2\pi} + \phi_S + 2\pi n \quad (2)$$

where $\Phi(t)$ is the phase-modulation generating function and $\Phi(t)_{mod\ 2\pi}$ is the phase modulation introduced by a phase modulator at one end of the fiber-optic coil in the interferometer 4, $\tau$ is the propagation time through the fiber optic coil, and ($\phi_S + 2\pi n$) is the so-called Sagnac phase resulting from the rotation of the fiber-optic coil about its axis. The integer n (called the Sagnac fringe number) is either positive or negative and the Sagnac residual phase $\phi_S$ is constrained to the range $-\pi \leq \phi_S < \pi$.

The output of the detector 6 is converted to digital form by the analog-to-digital converter 8 and then processed in the digital processor 10 to yield at the output a measure of the rate and angle of rotation of the interferometer 4. In addition, the digital processor 10 generates a phase-modulation generating function $\Phi(t)$, the modulo-$2\pi$ portion of which is converted to analog form by the digital-to-analog converter 12 and supplied to the phase modulator in the interferometer 4.

The phase-modulation generating function $\Phi(t)$ typically consists of a number of phase-modulation components among which are $\Phi_{SE}(t)$ and $\Phi_M(t)$. The phase-modulation component $\Phi_{SE}(t)$ is typically a stepped waveform with steps that change in height by $-\phi_{SE}$ at $\tau$ intervals where $\phi_{SE}$ is an estimate of $\phi_S$. Thus, the $\Phi_{SE}(t)$ modulation cancels in large part $\phi_S$. The accurate measurement of the uncancelled portion of the Sagnac residual phase $\phi_S$ is of great importance in that it is the quantity that is used in refining the estimate of the Sagnac phase and generating the $\Phi_{SE}(t)$ phase-modulation component.

The accurate measurement of the uncancelled portion of the Sagnac residual phase is greatly facilitated by choosing the $\Phi_M(t)$ phase-modulation component such that $[\Phi_M(t) - \Phi_M(t-E)]$ is equal to $j\phi_M$ where the permitted values of j are the values $-1$ and $1$ and $\phi_M$ is a predetermined positive phase angle somewhere in the vicinity $\pi/2$ radians where the slope of the cosine function is greatest. This effect can be achieved, for example, by having $\Phi_M(t)$ be a square wave with amplitude $\pi/2$ and period $2\tau$.

While it might appear that the best choice for $\phi_M$ would be $\pi/2$ where the slope of the cosine function is greatest, it has been shown that values between $\pi/2$ and $\pi$ provide better noise performance.

The $\Phi_M(t)$ modulation can also be a stepped function wherein the phase increases or decreases at $\tau$ intervals by $\phi_M$. Under these circumstances, $$[\Phi(t)]_{mod\ 2\pi} - [\Phi(t-\tau)]_{mod\ 2\pi} = 2\pi k - \phi_{SE} + j\phi_M \quad (3)$$

Substituting these expressions in equation (2), we obtain $$\theta = 2\pi(k+n) + j\phi_M \quad (4)$$

We ignore the term $\phi_S - \phi_{SE}$ for the purposes of the present discussion.

Fiber optic gyros generally employ broadband light sources in order to avoid polarization cross-coupling effects as the light propagates through the fiber. As a result, however, coherence is lost as non-reciprocal phase shifts between the clockwise and counter-clockwise beams are introduced. This leads to the "fringe visibility effect" whereby the interference pattern between the two beams loses contrast as the difference in optical paths increases.

SUMMARY OF THE INVENTION

The invention is a method for improving the performance of a fiber-optic gyro comprising counter-propagating light beams from a broadband source in an optical fiber configured as a coil. The fiber-optic gyro is of the type where the phases of the light beams are step-modulated at one or both ends of the optical fiber at time intervals equal to the light propagation time $\tau$ through the optical fiber, the step being in the range from 0 to $2\pi - \delta$ radians where $\delta$ is an infinitesimal. The step is the sum of an estimate of the Sagnac phase residual $\phi_{SE}$ with reversed sign and the quantity ($2\pi k + j\phi_M$) where the index k can take on the values $-1$, 0, and 1, and the index j can take on the values $-1$ and 1. The phase angle $\phi_M$ is a positive constant less than $\pi$ radians.

The method comprises the steps of determining the interferometer output light intensity, determining the Sagnac fringe number n, calculating the error $P_{nkj}$ in the interferometer output light intensity attributable to the use of a broadband light-beam source for particular values of an index pair (k,j), determining estimates $A_{kj}$ of the probabilities of the index pairs (k,j) by counting the occurrences of each index pair (k,j) over a period of time, and determining the bias $\varepsilon$ in the output of a fiber-optic gyro using the equation $$\varepsilon = S \sum_{k,j} j A_{kj} P_{nkj},$$

where S is the scale factor that translates interferometer output light intensity error into rotation rate of the fiber-optic gyro. The presence of the j within the summation represents the demodulation of the interferometer output which extracts the rate information.

DESCRIPTION OF THE PREFERRED EMBODIMENT

Figure 1:
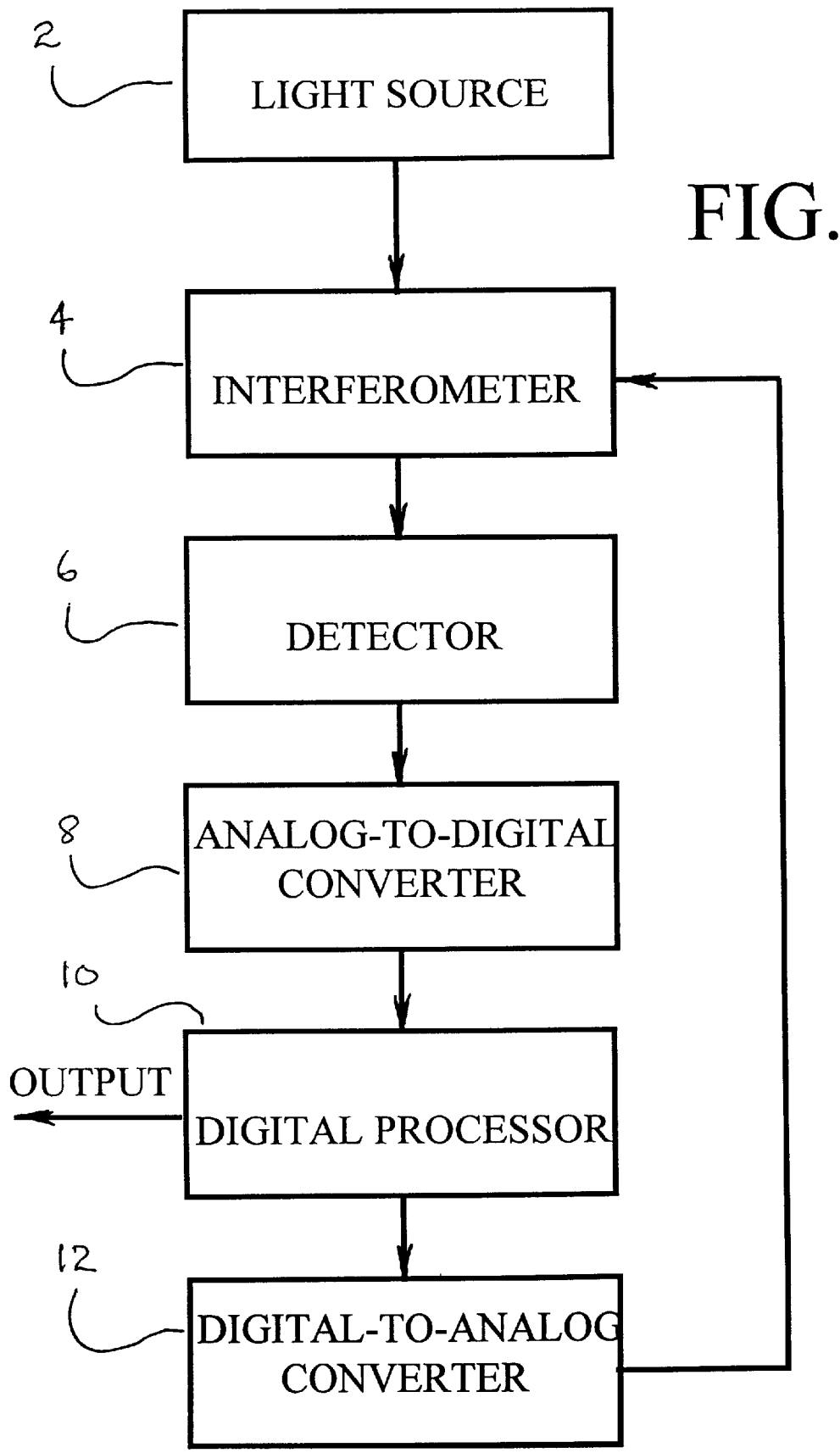
FIG. 1 is a block diagram of a fiber-optic gyro and associated control loop.

It can be shown that given a broadband source, equation (1) becomes (ignoring powers of θ-squared greater than one)

$$I = \frac{I_o}{2}[1 - (1 - \alpha\theta^2)\cos\theta] \qquad (5)$$

While this equation is an approximation, it holds relatively well for typical fiber-optic gyro sources whose line-widths are on the order of 1% of the wavelength.

With $\phi_M$ equal to an odd-integer multiple of $\pi/2$ radians, the fringe visibility error vanishes because cos θ equals zero. For other values of $\phi_M$ in a closed-loop fiber-optic gyro operating within the confines of a single fringe ($-\pi \leq \phi_S < \pi$) the effect manifests itself as a bias error that is rate-dependent and normally appears as a simple scale-factor miscalibration. However, for multiple fringe operation (n>1), the effect manifests itself as a bias error which is a function of phase shift within a fringe. Multiple-fringe operation is especially important in gyros with large Sagnac scale factors, the Sagnac scale factor being the ratio of the Sagnac phase to the rotation rate of the fiber-optic gyro.

The error in the intensity I from the interferometer resulting from fringe visibility can be calculated in the following way. Using equations (4) and (5), we can obtain the following expression for a closed-loop fiber-optic gyro operating with a modulation amplitude $\phi_M$.

$$-\left(\frac{I_0}{2}\alpha\cos\theta\right)\theta^2 = \beta(n+k)\left(n+k+j\frac{\phi_M}{\pi}\right) \qquad (6)$$

where we have dropped terms which contribute only to intensity level shift (i.e. which do not depend on j, k, or n) and $$\beta = -2\pi^2\alpha I_0 \cos\phi_M \qquad (7)$$

Substituting equation (6) in equation (5), we obtain $$I = \frac{I_0}{2}(1 + \cos\theta) + P_{nkj} + \text{DC intensity bias} \qquad (8)$$

where $$P_{njk} = \beta(n+k)\left(n+k+j\frac{\phi_M}{\pi}\right) \qquad (9)$$

The DC intensity bias is ignored in equation (8) since it does not contribute to gyro bias.

The quantity $P_{nkj}$ is the error in the measured intensity I from the interferometer. The resulting bias $\epsilon$ in the output from the fiber-optic gyro is then given by $$\varepsilon = S \sum_{k,j} j A_{kj} P_{nkj} \qquad (10)$$

where S is the scale factor that translates interferometer intensity variations into rotation rate of the fiber-optic coil and $A_{kj}$ is an estimate of the probability of the index pair (k,j). The quantity S is inversely proportional to the Sagnac scale factor of the gyro.

In order to constrain $[\Phi_M(t)]_{mod\ 2\pi}$ to the range from 0 to a value less than $2\pi$, k must satisfy the following relationship:

$$k = h - c \qquad (11)$$

where $$h = \text{SGN}(-\phi_{SE} + j\phi_M); \quad h = 0 \text{ denotes } +; h = 1 \text{ denotes } -. \qquad (12)$$

$$c = 0; \quad \{[\Phi(t-\tau)]_{mod\ 2\pi} + 2\pi h - \phi_{SE} + j\phi_M\} < 2\pi \qquad (13)$$
$$c = 1; \quad \text{otherwise}$$

The sum of $A_{kj}$ over the indices k and j must be equal to one. It also follows from the above that:

$$A_{1,1} = A_{-1,-1} = 0; \quad -\phi_M \leq \phi_{SE} \leq \phi_M$$
$$A_{1,1} = A_{1,-1} = 0; \quad -\pi \leq \phi_{SE} < -\phi_M$$
$$A_{-1,1} = A_{-1,-1} = 0; \quad \phi_M < \phi_{SE} < \pi \qquad (14)$$

It is desirable that the phase modulation be such that the following statistical relationships apply:

$$\sum_k A_{kj} = \frac{1}{2} \qquad (15)$$

$$A_{-1,1} + A_{1,-1} = \frac{\phi_M}{2\pi}; \quad -\phi_M \leq \phi_{SE} \leq \phi_M \qquad (16)$$

$$A_{-1,1} - A_{-1,-1} = \frac{\phi_M}{2\pi}; \quad -\pi \leq \phi_{SE} < -\phi_M$$

$$A_{1,-1} - A_{1,1} = \frac{\phi_M}{2\pi}; \quad \phi_M < \phi_{SE} \leq \pi$$

It follows that $$\varepsilon = S\beta\left[(A_{0,1} - A_{0,-1})\left(1 - \frac{\phi_M}{\pi}\right) + 2\frac{\phi_M}{\pi}(A_{-1,-1} - A_{1,1})\right] \qquad (17)$$

or alternatively $$\varepsilon = S\beta\left[(A_{0,1} - A_{0,-1})\left(1 + \frac{\phi_M}{\pi}\right) - 2\frac{\phi_M}{\pi}(A_{1,-1} - A_{-1,1})\right] \qquad (18)$$

It should be noted that using a phase-modulating function having the prescribed statistical properties results in a bias in the output from the fiber-optic gyro that is independent of the Sagnac fringe number n.

Estimates of the A's can be obtained by counting the occurrences of the index pairs (k,j) during operation.

What is claimed is:

1. A method for determining bias in a fiber-optic gyro comprising counter-propagating light beams from a broadband source in an optical fiber, the phases of the light beams being step-modulated at one or both ends of the optical fiber at time intervals approximately equal to the light propagation time τ through the optical fiber, the step being in the range from 0 to $2\pi-\delta$ radians, δ being an infinitesimal, the step being the sum of an estimate of the Sagnac phase residual $\phi_{SE}$ with reversed sign and the quantity $(2\pi k + j\phi_M)$, the permitted values of the index k being the values −1, 0, and 1, the permitted values of the index j being the values −1 and 1, the phase angle $\phi_M$ being a positive constant less than π radians, the method comprising the steps:

determining the interferometer output light intensity;

calculating the bias $\epsilon$ in the interferometer output light intensity attributable to the use of a broadband light-beam source.

2. The method of claim 1 wherein a phase-modulation generating function $\{\Phi(t)\}_{mod\ 2\pi}$ is defined by the equation $\{\Phi(t)\}_{mod\ 2\pi} = \{\Phi(t-\tau)\}_{mod\ 2\pi} + 2\pi k - \phi_{SE} + j\phi_M,$ the method further comprising the step:

determining the value of index k from the values of h and c, h being equal to zero if the sign of $(-\phi_{SE}+j\phi_M)$ is positive, h otherwise being equal to one, c being equal to zero if $\{(t-\tau)\}$ mod $2\pi+2\pi h-\phi_{SE}+j\phi_M$ is less than $2\pi$, c otherwise being equal to 1.

3. The method of claim 1 further comprising the step:

determining the bias $\epsilon$ in the output of a fiber-optic gyro attributable to the use of a broadband light-beam source utilizing the light intensity errors $P_{nkj}$, n being the Sagnac fringe number.

4. The method of claim 3 wherein the bias $\epsilon$ is independent of the Sagnac fringe number.

5. The method of claim 1 further comprising the step:

determining estimates $A_{kj}$ of the probabilities of the index pairs (k,j) by counting the occurrences of each index pair (k,j) over a period of time.

6. The method of claim 5 further comprising the step:

determining the bias $\epsilon$ in the output of a fiber-optic gyro attributable to the use of a broadband light-beam source using the equation, $$\varepsilon = S \sum_{k,j} jA_{kj}P_{nkj},$$

$P_{nkj}$ being the light intensity errors, n being the Sagnac fringe number, S being the scale factor that translates interferometer intensity variations into rotation rate of the fiber-optic gyro.

7. The method of claim 6 wherein the bias $\epsilon$ is independent of the Sagnac fringe number.

8. The method of claim 5 further comprising the step:

determining the bias $\epsilon$ in the output of a fiber-optic gyro attributable to the use of a broadband light-beam source using the equation, $$\varepsilon = S\beta\left(2\frac{\phi_M}{\pi}A_{-1,-1} + (-A_{0,-1} + A_{0,1})\left(1 - \frac{\phi_M}{\pi}\right) - 2\frac{\phi_M}{\pi}A_{1,1}\right)$$

S being the scale factor that translates interferometer intensity variations into rotation rate of the fiber-optic gyro and $\beta$ is a constant for a particular fiber-optic gyro configuration.

9. The method of claim 1 wherein the light intensity error $P_{nkj}$ is approximately proportional to $\theta^2 \cos\theta$, $\theta$ being the difference in phase of the light beams emerging from each end of the optical fiber, n being the Sagnac fringe number.

10. The method of claim 1 wherein the light intensity error $P_{nkj}$ is approximately proportional to $$(n+k)\left(n+k+j\frac{\phi_M}{\pi}\right).$$

* * * * *